Patented Feb. 24, 1953

2,629,666

UNITED STATES PATENT OFFICE 2,629,666

RUST PREVENTATIVE COMPOSITION

Arnold J. Morway, Clarktownship, Union County, and David W. Young, Roselle, N. J., assignors to Standard Oil Development Company, a corporation of Delaware No Drawing. Application May 18, 1951,
Serial No. 227,098

5 Claims. (Cl. 106—14)

This invention relates to rust preventative compositions, especially to compositions useful for the preservation of metals, and articles fabricated from iron, steel, and other ferrous alloys. Particularly this invention relates to coating or swabbing compositions prepared from asphaltic cut backs. More particularly this invention relates to coating compositions prepared by thickening asphaltic cut backs with minor amounts of an acyl p-amino phenol.

The corrosion of a metal, particularly a ferrous metal, is a problem which has existed since the making of metal, and articles from metal, began. Many corrosion problems arise calling for special consideration such, for example, as the handling of large volumes of acids, alkalies, and other corrosive substances. By far the greatest corrosion problem, however, is in connection with ferrous metals and this tendency to corrode when exposed to even natural atmospheric conditions. Active corrosion of metallic surfaces has been impeded, arrested, or prevented by coating the surface of metals or metallic articles with an inert, impervious film applied by dipping, spraying, brushing, or swabbing.

In the rust preventatives of the prior art, those liquid or fluid compositions, and even those of the semi-liquid type, often have a tendency to "slump" off of the surface to be protected, or to run off or drip, leaving either a thin film or no preservative behind.

This invention has as its object the preparation of a "non-slumping" rust preventative composition which preferentially wets the ferrous metal surface to which applied in a continuous manner and displaces water from said surfaces. The rust preventatives of the invention have the added advantage of containing an anti-oxidation agent which prevents surface hardening and the formation of checks through which water might reach the metal surface.

Briefly stated the compositions of this invention consist essentially of an asphaltic cut back which has been thickened to a plastic grease-like structure with a minor amount of an N-acyl p-amino phenol. The acyl p-amino phenol serves as the thickener and as the oxidation inhibitor. The compositions have melting points above the boiling point of water and due to their plastic structure are easily applied. In addition, waxes may be compounded with the asphaltic cut backs to prepare materials with even higher melting points.

The base for the rust preventative materials may be, as is set out above, an asphalt, cut back to the desired viscosity with a mineral oil. Any asphaltic material may be used, either an oxidized asphalt, or the usual asphaltic material obtained by the straight reduction of crude oil. It is ordinarily desired to cut back these materials with a mineral oil until the viscosity of the blend is between 3800 and 4200 S. U. S. at 210° F., preferably 3850 to 4100 S. U. S. at 210° F.

The compositions of this invention are prepared by mixing with the base the desired amount of the selected acyl p-amino phenol, heating the mixture to the temperature necessary to solubilize the phenol and allowing to cool. The compositions are completely reversible and may be heated and cooled any number of times, the grease like structure reforming on cooling.

The acyl p-amino phenols used in the preparation of the materials of invention have the following general formula:

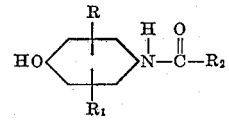

wherein R and R₁ are hydrogen atoms or alkyl groups of from 1 to 15 carbon atoms, and wherein R₂ is an alkyl group containing from 4 to 22 carbon atoms.

The preferred embodiment of the invention contemplates the use of compounds according to the formula above where R₂ contains from 14 to 22 carbon atoms and wherein R and R₁ are hydrogen, i. e., the N-acyl p-amino phenols. However, the alkylated acyl p-amino phenols such as N-n-valeryl-4-amino-3-pentadecyl phenol, N-n-valeryl-4-amino-2,6, ditertiary butyl phenol, N-n-hexoyl-4-amino-2-hexyl phenol are operable in forming the inventive compositions.

The preparation of these acyl p-amino phenols is achieved by admixing the desired acid, or acid chloride, with p-amino phenol and heating the mixture under proper conditions. The reaction progresses smoothly, splitting off water, or hydrogen chloride, and giving the desired acylated p-amino phenol which may be purified by any of the methods known to the art such as distillation, crystallization, extraction, etc. This preparation is typified by the following:

One mol of p-amino phenol was placed in a glass round bottomed flask fitted with a reflux condenser with an azeotropic take off arm. There was added to the flask one mol of stearic acid and about 150 c. c. of xylene. The xylene served as an entraining agent for the water formed during the course of the reaction. The flask was then heated to the xylene reflux temperature and kept at that temperature for about 9 hours, or until 86% of the theoretical water (1 mol) had been removed. The contents of the flask was then emptied into an evaporating dish and heated on a steam bath until the last trace of xylene was removed. The product was then recrystallized from glacial acetic acid and there resulted a yield of 78% theoretical of colorless N-stearoyl p-amino phenol, melting point 132° C. Analysis for nitrogen was 3.75%, compared to a calculated 3.78%.

As the acidic constituent of the reaction mixture, any organic acid containing from 4 to 22 carbon atoms may be used. If desired, mixed acids having an average carbon chain length within this range may be used, such as for example, hydrogenated fish oil acids, tallow acids, coconut acids, and the like.

The compositions of invention contain from 0.5% to 6% by weight of the acyl p-amino phenols, depending upon the consistency desired in the final product. A preferred range of the p-amino phenol is from 3-5%, percentages being by weight, based on the weight of the total composition.

To more specifically illustrate the invention the following examples are given.

Example I

With 98% by weight of cut back oxidized asphalt having a viscosity at 210° F. of 2500 S. U. S. there was admixed 2.0% of N-stearoyl p-amino phenol. This acyl amino phenol was prepared from p-amino phenol and commercial stearic acid, the latter being a mixture of palmitic and stearic acids. The mixture was heated to 250-275° F. until the phenol was solubilized and allowed to cool. The compound was a solid non-viscous mass with a dropping point of 220° F.

A polished steel test panel was coated by dipping it into the material heated to 250° F. The test panel was allowed to cool and immersed in boiling water for 20 minutes. There was no tendency for the coating to flow off or be washed off. After this treatment the panel was allowed to hang at room temperature for 14 days and after that period showed no corrosion of the metal surface or removal of the protective coating.

If it is desired, a protective coating composition of superior quality may be prepared according to the concept of this invention by utilizing a mixture of an asphalt and a petrolatum as the base. This mixture may vary from 1% to 75% petrolatum, depending upon the quality desired. This concept is illustrated by Example II, below.

Example II

A mixture of 49% by weight of an asphaltic cut back having a viscosity at 210° F. of 2500 was admixed with 49% by weight of a petrolatum having a viscosity at 210° F. of about 98 S. U. S. With this blend was mixed 2.0% by weight of N-stearoyl p-amino phenol and the mixture heated to 250-275° F.

A polished steel test panel was treated with this material as in Example I above showed no corrosion or tendency to lose the protective coating after 20 minutes immersion and 14 days at room temperature.

As is well known in the art of lubricating oil manufacture the asphaltic materials serving as a base of the rust preventative compositions of this invention are prepared by simply removing the lighter fractions from a crude petroleum. This may be done by steam distillation or by vacuum flashing. Another process for the preparation of asphaltic materials more recently developed is the utilization of solvent separation using a propane deasphalting process. After the crude petroleum is treated in this propane deasphalting process it has been found that a subsequent and further propane treatment results in the separation of resinous materials which have considerable utility in many lubricating uses.

Particularly advantageous use of these propane extracted resins, which consist essentially of the higher molecular weight compounds of the lubricating oil range, is their use as gear lubricants suitable for the lubricating of enclosed gears, particularly the traction motor gears of diesel electric locomotives.

The lubrication of these traction driving motor gears is unique in that these gears run in an enclosed gear case. This case, however, is not ordinarily sufficiently tight to retain light oils and it has been practiced to use viscous asphaltic oil residues. Even so a considerable amount of make-up lubricant has been required in the past to replace leakage. Due to the greater retention of the gear lubricant resulting from an improvement in the gear case the currently employed asphaltic residuents are no longer completely suitable due to an undue thickening resulting from the higher temperatures encountered.

These propane extracted resins may also be thickened to solid lubricants having excellent adhesive properties by the addition of small amounts of the N-acyl-p-amino phenols described above. In the formation of solid lubricants for this use viscosity is not an essential requirement of the base oil and the resin selected may be diluted with mineral oil.

Examples of the solid lubricant prepared from these resinous materials are set out below.

Example III

A blend of one-third of a mineral oil and two-thirds of the propane extracted resin from a Mid-Continent Panhandle crude was heated with 1% of N-stearoyl-p-amino phenol while stirring to 220 to 230° F. The mixture was then allowed to cool and resulted in a smooth adhesive grease composition having a melting point of 214° F. Since the operating temperature of the new improved gear cases is in the neighborhood of 150° F. this lubricating composition is very satisfactory for this use.

Example IV

99% of a propane extracted resin from a Pennsylvania crude was heated with stirring to 220 to 230° F. with 1% of N-stearoyl-p-amino phenol. When the mixture was allowed to cool an excellent smooth adhesive grease composition having a dropping point of 230° F. resulted.

What is claimed is:

1. A rust preventative composition consisting essentially of an asphalt which has been thickened to a grease-like structure with 0.5% to 6.0% by weight of a material having the formula:

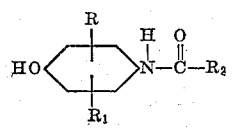

wherein R and R₁ are selected from the class consisting of hydrogen and alkyl groups containing from 4 to 15 carbon atoms and R₂ is an alkyl group containing from 4 to 22 carbon atoms.

2. A rust preventative composition according to claim 1 wherein R and R₁ are hydrogen.

3. A rust preventative composition consisting essentially of an asphalt having a viscosity within the range of 3800 and 4200 S. U. S. at 210° F. thickened to a grease-like structure with from 1% to 6% by weight of a material of the formula

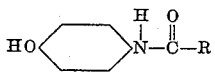

wherein R is an alkyl group having from 4 to 22 carbon atoms.

4. A rust preventative composition consisting essentially of a hydrocarbon material consisting of 49% by weight of cut back asphalt and 49% of petrolatum, said mixture having a viscosity at 210° F. of from 3800 to 4200 S. U. S., thickened to a grease-like structure with from 1% to 6% by weight of N-stearoyl p-amino phenol.

5. A rust preventative composition consisting essentially of a cut back asphalt having a viscosity of about 4000 S. U. S. at 210° F. thickened to a grease-like structure with about 2% by weight of N-stearoyl p-amino phenol.

ARNOLD J. MORWAY.
DAVID W. YOUNG.

No references cited.